United States Patent
Cojocariu et al.

(10) Patent No.: US 8,623,948 B2
(45) Date of Patent: Jan. 7, 2014

(54) POLYCARBONATE COMPOSITIONS HAVING ANTISTATIC ENHANCERS, METHOD OF PREPARING, AND ARTICLES COMPRISING THE SAME

(75) Inventors: Cristina Cojocariu, Evansville, IN (US); Elif Gurel, Jacksonville, FL (US); Theodorus Lambertus Hoeks, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 567 days.

(21) Appl. No.: 12/146,709

(22) Filed: Jun. 26, 2008

(65) Prior Publication Data

US 2009/0326116 A1    Dec. 31, 2009

(51) Int. Cl.
   *C08K 5/50*      (2006.01)
(52) U.S. Cl.
   USPC ........................... 524/115; 524/154
(58) Field of Classification Search
   USPC ....................................... 524/115
   See application file for complete search history.

(56) References Cited

U.S. PATENT DOCUMENTS

| | | | |
|---|---|---|---|
| 3,775,367 A | 11/1973 | Nouvertne | |
| 4,943,380 A | 7/1990 | Sugiura et al. | |
| 6,194,497 B1 | 2/2001 | Willems et al. | |
| 6,382,419 B1 * | 5/2002 | Fujimori et al. | 206/454 |
| 6,727,302 B2 * | 4/2004 | Goossens et al. | 524/161 |
| 2006/0100327 A1 * | 5/2006 | Hoeks et al. | 524/115 |

OTHER PUBLICATIONS

ASTM Designation: D 1003-00, "Standard Test Method for Haze and Luminous Transmittance of Transparent Plastics," pp. 1-6, 2000.
ASTM Designation: D 1238-04, "Standard Test Method for Melt Flow Rates of Thermoplastics by Extrusion Plastometer," pp. 1-13, 2004.
ASTM Designation: D 1925-70, "Standard Test Method for Yellowness Index of Plastics," pp. 1-3, 1970.
International Standard: ISO 1133, "Plastics—Determinaton of the Melt Mass-Flow Rate (MFR) and the Melt Volume-Flow Rate (MVR) of Thermoplastics," pp. 1-16, 2005.

* cited by examiner

*Primary Examiner* — Doris Lee
(74) *Attorney, Agent, or Firm* — Cantor Colburn LLP

(57) ABSTRACT

A thermoplastic composition comprising a polycarbonate, a perfluoroalkyl sulfonate phosphonium salt, and a non-phosphonium perfluoroalkyl sulfonate salt is disclosed, wherein a molded flat disk prepared from the thermoplastic composition has a surface resistivity of $1.0 \times 10^{10}$ to $1.0 \times 10^{14}$ ohms measured at a temperature of 23±2° C. and at 50±1% relative humidity. A method of making the thermoplastic composition, and articles prepared therefrom, are also disclosed.

26 Claims, 1 Drawing Sheet

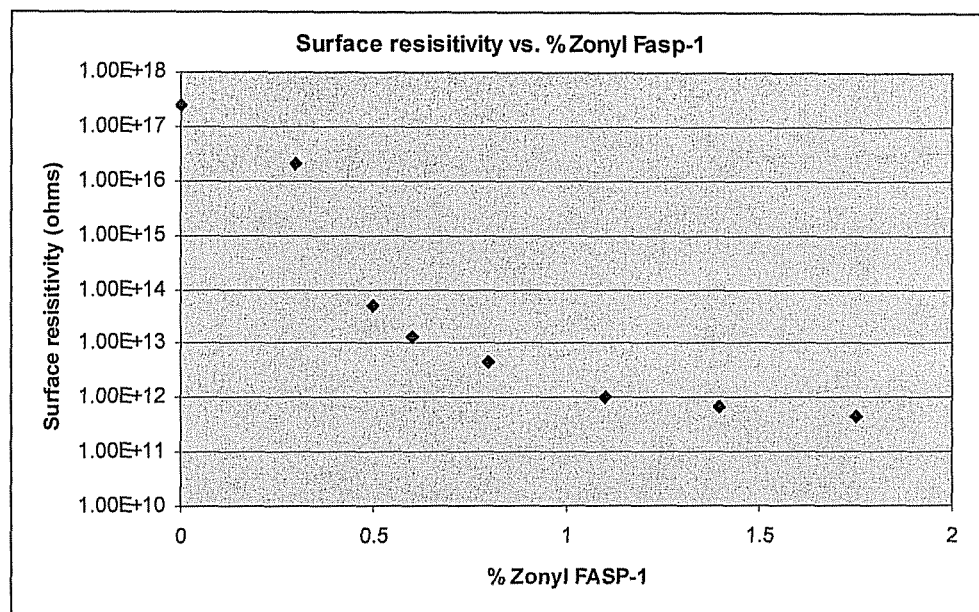

POLYCARBONATE COMPOSITIONS HAVING ANTISTATIC ENHANCERS, METHOD OF PREPARING, AND ARTICLES COMPRISING THE SAME

BACKGROUND OF THE INVENTION

Polycarbonates are inherently electrically insulating. Polycarbonate articles, particularly those with a high surface area such as films or sheets, are therefore generally prone to the accumulation of a surface static electric charge (also referred to as surface static charge), which may not dissipate rapidly. Such accumulated charge attracts dust and dirt from the environment, which can reduce the transparency of a clear plastic article, or reduce the gloss or surface finish of an opaque or colored part, and thereby impart a low aesthetic quality to the part. In addition, in optical film applications, the attracted dust and static cling between films may reduce the product yield during the various cutting and assembly processes.

Antistatic agents can be used to reduce surface static charge. Antistatic agents (also referred to herein as "antistats") may be ionic or non-ionic in nature, and generally include a hydrophilic head and a hydrophobic tail portion. The hydrophilic head of the antistat forces the molecule to migrate to the surface wherein hydrogen bonding with atmospheric moisture can form a conductive surface layer of water, which promotes the dissipation of electrostatic charges. As a result, dust particles are attracted to a lesser extent, and the fixation of dust is significantly diminished. Ionic antistats generally have poor heat resistance compared to non-ionic antistats, but generally have good antistatic properties.

Antistatic agents can also be applied to the surface of a finished plastic part by spraying, wiping or dipping. Such antistatic agents are referred to as external antistats, and in general they have a pronounced and immediate effect on dissipating charge. However, such antistats are susceptible to accidental removal by abrasion, or by environmental agents, and therefore to maintain antistatic behavior in the part, reapplication is usually needed.

Antistatic agents can also be added to the polycarbonate compositions prior to processing (e.g., extruding, molding, etc.). Incorporated in this way, the antistatic agents are usually referred to as internal antistats. Internal antistats therefore need to be thermally stable to withstand polycarbonate processing conditions. It is also desirable that these antistatic agents be able to migrate to the surface of the article during processing so as to impart the most effective antistatic decay behavior. Additionally, the incorporation of antistatic agents should preferably not diminish desirable characteristics of the polycarbonate material such as transparency. The use of internal antistatic agents is generally preferable to using external antistatic agents as they offer longer-term protection and there are no additional processing steps required after manufacturing a finished plastic part.

Phosphonium salts of certain sulfonic acids have been used as antistatic agents for polycarbonates. For example, U.S. Pat. No. 4,943,380 discloses the reduction of the static charge on polycarbonate resin with an alkylphenyl sulfonate phosphonium salt. A drawback of alkylphenyl sulfonate phosphonium salts is that high concentration levels are required for satisfactory antistatic behavior, which can lead to deterioration of other desirable properties of polycarbonates such as haze and/or transparency, impact strength, or melt flow rate.

U.S. Pat. No. 6,194,497 discloses antistatic resin compositions, including transparent resin compositions comprising perfluoroalkyl sulfonate phosphonium salts as antistatic agents. In the above-mentioned patent, it is shown that tetrabutyl phosphonium perfluorobutyl sulfonate has better antistatic properties at significantly lower concentration than tetrabutylphosphonium dodecyl benzene sulfonate (trade name EPA-202 antistat, available from Takemoto Oil & Fat Co.). EPA-202 antistat is the antistatic agent disclosed in U.S. Pat. No. 4,943,380. For example, it has been found that a polycarbonate composition having 0.8 wt % tetrabutyl phosphonium perfluorobutyl sulfonate has a surface resistivity that is equivalent to that of a polycarbonate composition having 2 wt % EPA-202 antistatic agent. Non-phosphonium containing perfluoroalkyl sulfonate salts such as alkali metal perfluoroalkyl sulfonate salts have not been recognized in the art as antistatic agents but have been found to impart improved flame resistance (FR) to polycarbonates as recognized in U.S. Pat. No. 3,775,367.

Although the use of perfluoroalkyl sulfonate phosphonium salts provides good antistatic properties at relatively low loadings, there still remains a need for improving the effectiveness of antistatic agents in thermoplastic compositions. In particular, there is a need for thermoplastic polycarbonate based compositions having a low content of antistatic agent with superior static dissipative characteristics, in which the optical properties are maintained.

BRIEF SUMMARY OF THE INVENTION

The above-described and other drawbacks are alleviated by, in an embodiment, a thermoplastic composition comprising a polycarbonate, a perfluoroalkyl sulfonate phosphonium salt, and a non-phosphonium perfluoroalkyl sulfonate salt, wherein a molded flat disk prepared from the thermoplastic composition has a surface resistivity of $1.0 \times 10^{10}$ to $1.0 \times 10^{14}$ ohms measured at a temperature of 23±2° C. and at 50±1% relative humidity.

In an embodiment, a thermoplastic composition comprises a polycarbonate, 0.001 to 1.0 parts by weight of a perfluoroalkyl sulfonate phosphonium salt, and 0.01 to 0.1 parts by weight of a non-phosphonium perfluoroalkyl sulfonate salt, wherein the amounts of perfluoroalkyl sulfonate phosphonium salt and non-phosphonium perfluoroalkyl sulfonate salt are each based on 100 parts of the polycarbonate, wherein a molded flat disk prepared from the thermoplastic composition has a surface resistivity of $1.0 \times 10^{10}$ to $1.0 \times 10^{14}$ ohms measured at a temperature of 23±2° C. and at 50±1% relative humidity, and wherein an article molded from the thermoplastic composition and having a thickness of 3.18 millimeters has a haze of 0.01 to 1.0% according to ASTM D 1003-00.

In another embodiment, an article comprises a polycarbonate, a perfluoroalkyl sulfonate phosphonium salt, and a non-phosphonium perfluoroalkyl sulfonate salt, wherein the article has a surface resistivity of $1.0 \times 10^{10}$ to $1.0 \times 10^{14}$ ohms measured at a temperature of 23±2° C. and at 50±1% relative humidity, and wherein the article has a haze value which when normalized for a thickness of 3.18 millimeters is 0.01 to 1.0%, measured according to ASTM D1003-00.

In another embodiment, a method of making a thermoplastic composition comprises melt blending a polycarbonate, a perfluoroalkyl sulfonate phosphonium salt, and a non-phosphonium perfluoroalkyl sulfonate salt, wherein a molded flat disk prepared from the thermoplastic composition has a surface resistivity of $1.0 \times 10^{10}$ to $1.0 \times 10^{14}$ ohms measured at a temperature of 23±2° C. and at 50±1% relative humidity.

In another embodiment, a method of reducing the surface charge of an article comprising a thermoplastic composition, comprises adding a non-phosphonium perfluoroalkyl sulfonate salt, to a combination of a polycarbonate and a perfluoroalkyl sulfonate phosphonium salt, wherein a molded flat disk prepared from the thermoplastic composition has a surface resistivity of $1.0 \times 10^{10}$ to $1.0 \times 10^{14}$ ohms measured at a temperature of 23±2° C. and at 50±1% relative humidity, and wherein the article has a static decay time for positive charge of 0.1 to 6 seconds, and a static decay time for negative charge of 0.1 to 7 seconds.

A description of the FIGURE, which is meant to be exemplary and not limiting, is provided below.

BRIEF DESCRIPTION OF THE FIGURE

The FIGURE is a plot of surface conductivity vs. percent (by weight) of antistatic agent in polycarbonate.

The above described and other features are exemplified by the following detailed description.

DETAILED DESCRIPTION OF THE INVENTION

The present disclosure describes polycarbonate-based thermoplastic compositions having improved antistatic properties obtained from the combination of a perfluoroalkyl sulfonate phosphonium salt and a non-phosphonium perfluoroalkyl sulfonate salt. In particular, the non-phosphonium perfluoroalkyl sulfonate salt can be, in an exemplary embodiment, an alkali metal salt, used in weight concentrations of less than or equal to 0.16 parts per hundred parts (phr) by weight of the polycarbonate. It will be noted that, as used herein, phr and parts by weight each based on 100 parts of the polycarbonate are equivalent measures. The inclusion of such quantities provides for lower haze, higher transparency, lower surface resistivity, and faster charge dissipation for polycarbonate-based thermoplastic compositions prepared using the combination.

As disclosed herein, the thermoplastic composition includes a polycarbonate. As used herein, the terms "polycarbonate" and "polycarbonate resin" mean compositions having repeating structural carbonate units of the formula (1):

  (1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

-A$^1$-Y$^1$-A$^2$  (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—R$^1$—OH, which includes dihydroxy compounds of formula (3):

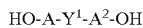  (3)

wherein $Y^1$, $A^1$ and $A^2$ are as described for formula (2) above. Also included are bisphenol compounds of general formula (4):

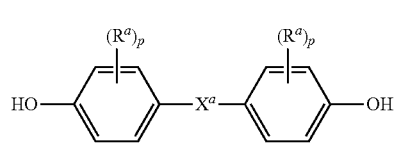  (4)

wherein $R^a$ and $R^b$ each represent a halogen atom or a monovalent hydrocarbon group and may be the same or different; p and q are each independently integers of 0 to 4; and $X^a$ represents one of the groups of formula (5):

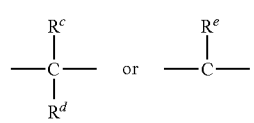  (5)

wherein $R^c$ and $R^d$ each independently represent a hydrogen atom or a monovalent linear or cyclic hydrocarbon group and $R^e$ is a divalent hydrocarbon group.

Bisphenol structures of formula (4) can include a heteroatom-containing cyclic alkylidene group $X^a$ comprising at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

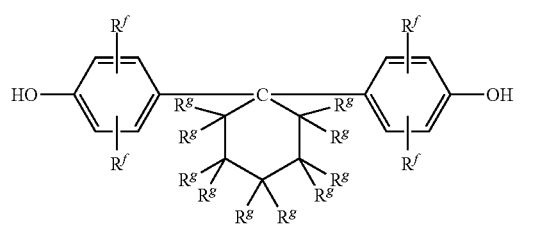  (6)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

"Polycarbonates" and "polycarbonate resins" as used herein include homopolycarbonates and copolymers comprising different $R^1$ moieties in the carbonate (referred to herein as "copolycarbonates"). In a specific embodiment, the polycarbonate is a linear homopolymer derived from bisphenol A, in which each of $A^1$ and $A^2$ is p-phenylene and $Y^1$ is isopropylidene.

The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate has a melt volume flow rate (often abbreviated MVR) which represents a measure of the rate of extrusion of a thermoplastic through an orifice at a prescribed temperature and load. Polycarbonates useful for the formation of articles may have an MVR, measured at 300° C. under a load of 1.2 kg according to ASTM D1238-04 or ISO 1133, of 0.5 to 80 cubic centimeters per 10 minutes (cc/10 min). In a specific embodiment, a useful polycarbonate or combination of polycarbonates (i.e., a polycarbonate composition) has an MVR measured at 300° C. under a load of 1.2 kg according to ASTM D1238-04 or ISO 1133, of 0.5 to 20 cc/10 min, specifically 0.5 to 18 cc/10 min, and more specifically 1 to 15 cc/10 min.

Polycarbonates as defined herein can further broadly include copolymers comprising carbonate units of formula (1) and other types of polymer units, such as ester units, polysiloxane units, and combinations of polymers comprising at least one of homopolycarbonates and copolycarbonates. As used herein, "combination" is inclusive of blends, mixtures, alloys, reaction products, and the like. A specific type of copolycarbonate is a polyester carbonate, also known as a polyester-polycarbonate. Such copolymers further contain, in addition to recurring carbonate chain units of the formula (1), repeating units of formula (8):

(8)

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In an embodiment, $R^2$ is a $C_{2-30}$ alkylene group having a straight chain, branched chain, or cyclic (including polycyclic) structure. In another embodiment, $R^2$ is derived from an aromatic dihydroxy compound of formula (4) above. In another embodiment, $R^2$ is derived from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

Polycarbonates can generally be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents may be added at a level of about 0.05 to about 2.0 wt %. Mixtures comprising linear polycarbonates and branched polycarbonates may be used.

All types of polycarbonate end groups are contemplated as being useful in the polycarbonate composition, provided that such end groups do not significantly adversely affect desired properties of the compositions.

A chain stopper (also referred to as a capping agent) may be included during polymerization to form the end group. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a BANBURY® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Polyester-polycarbonates may also be prepared by interfacial polymerization. Rather than utilizing the dicarboxylic acid, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or a combination comprising at least one of the foregoing, it is possible to employ isophthaloyl dichloride, terephthaloyl dichloride, and a combination comprising at least one of the foregoing.

In addition to the polycarbonates described above, combinations of the polycarbonate with other thermoplastic polymers, for example combinations of homopolycarbonates and/or polycarbonate copolymers with polyesters, may be used. Useful polyesters may include, for example, polyesters having repeating units of formula (8), which include poly(alkylene dicarboxylates), liquid crystalline polyesters, and polyester copolymers. The polyesters described herein are generally completely miscible with the polycarbonates when blended.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

Useful polyesters may include aromatic polyesters, poly(alkylene esters) including poly(alkylene arylates), and poly(cycloalkylene diesters). Aromatic polyesters may have a polyester structure according to formula (8), wherein D and T are each aromatic groups as described hereinabove. In an embodiment, useful aromatic polyesters may include, for example, poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)]ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) may have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (9):

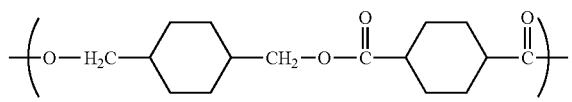

(9)

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polycarbonate and polyester and/or polyester-polycarbonate may be used in a weight ratio of 1:99 to 99:1, specifically 10:90 to 90:10, and more specifically 30:70 to 70:30, depending on the function and properties desired.

The polyester-polycarbonates or polyesters may have a weight-averaged molecular weight ($M_w$) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Where used, it is desirable for a polyester-polycarbonate to have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04. Commercial polyester blends with polycarbonate are marketed under the trade name XYLEX® polymers, including for example XYLEX® X7300 polymer, and commercial polyester-polycarbonates are marketed under the tradename LEXAN® SLX polymers, including for example LEXAN® SLX-9000, and are available from SABIC Innovative Plastics (formerly GE Plastics).

The thermoplastic composition may also comprise a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (10):

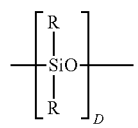

(10)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (10) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (11):

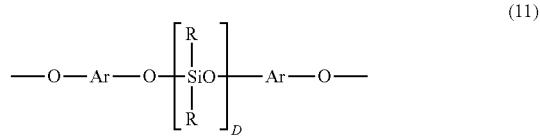

(11)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (11) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of dihydroxyarylene compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (11) may be derived from the corresponding dihydroxy compound of formula (12):

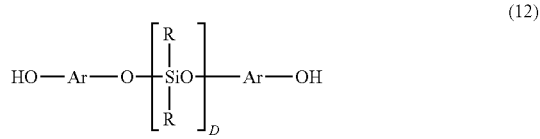

(12)

wherein R, Ar, and D are as described above. Compounds of formula (12) may be obtained by the reaction of a dihydroxyarylene compound with, for example, an alpha,omega-bisacetoxypolydiorangonosiloxane under phase transfer conditions.

In another embodiment, polydiorganosiloxane blocks comprise units of formula (13):

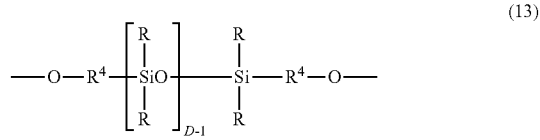

(13)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (14):

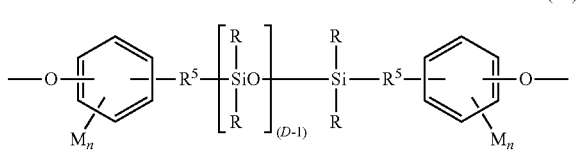

(14)

wherein R and D are as defined above. Each $R^5$ in formula (14) is independently a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (14) may be derived from the corresponding dihydroxy polydiorganosiloxane (15):

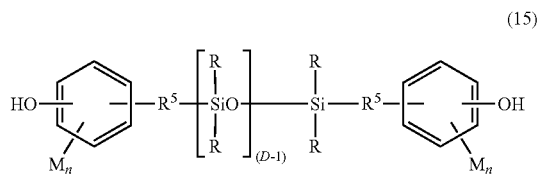

(15)

wherein R, D, M, $R^5$, and n are as described above. Such dihydroxy polysiloxanes can be made by effecting a platinum catalyzed addition between a siloxane hydride of formula (16):

(16)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate may comprise 50 to 99 wt % of carbonate units and 1 to 50 wt % siloxane units. Within this range, the polysiloxane-polycarbonate copolymer may comprise 70 to 98 wt %, specifically 75 to 97 wt % of carbonate units and 2 to 30 wt %, specifically 3 to 25 wt % siloxane units.

In an embodiment, the polysiloxane-polycarbonate may comprise polysiloxane units, and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 kg, of 1 to 50 cubic centimeters per 10 minutes (cc/10 min), specifically 2 to 30 cc/10 min. Mixtures of polysiloxane-polycarbonates of different flow properties may be used to achieve the overall desired flow property. In an embodiment, exemplary polysiloxane-polycarbonates are marketed under the trade name LEXAN® EXL polycarbonates, available from SABIC Innovative Plastics (formerly GE Plastics).

The thermoplastic composition includes an antistatic agent mixture that includes a combination of at least one of an antistatic agent, such as perfluoroalkyl sulfonate phosphonium salt, and a non-phosphonium perfluoroalkyl sulfonate salt acting as an antistatic enhancer. The perfluoroalkyl sulfonate phosphonium salt antistatic agent may be a highly halogenated phosphonium sulfonate salt containing a perfluoroalkyl sulfonate anion, and a tetrasubstituted phosphonium cation. Where "perfluoroalkyl" is referred to herein, it will be appreciated that small amounts of partially fluorinated alkyl groups may be present, as one skilled in the art will appreciate that due to limitations of commercial production methods for fluorination (electrolysis), sometimes only partly fluorinated compounds are formed. In an embodiment, perfluoroalkyl groups include less than or equal to 1 mol %, specifically less than or equal to 0.5 mol %, and still more specifically less than or equal to 0.1 mol % of partially fluorinated alkyl groups.

In an embodiment, the perfluoroalkyl sulfonate anion is a $C_{1-22}$ perfluoroalkyl sulfonate anion, where the perfluoroalkyl sulfonate may be straight chain, branched, or cyclic (monocyclic, polycyclic, fused polycyclic, or a combination of these) in structure. Specific examples of perfluoroalkyl sulfonate anions include trifluoromethyl sulfonate (also referred to a perfluoromethyl sulfonate), 2,2,2-trifluoroethyl sulfonate, perfluoroethyl sulfonate, perfluoro-n-propyl sulfonate, perfluoro-2-propyl sulfonate, perfluoro-n-butyl sulfonate, perfluoro-2-butyl sulfonate, perfluoroisobutyl sulfonate, perfluoro-t-butyl sulfonate, perfluorocyclopentyl sulfonate, perfluorocyclohexyl sulfonate, perfluorocyclohexylmethyl sulfonate, perfluoro(ethyl cyclohexylmethyl) sulfonate, or a combination comprising at least one of the foregoing perfluoroalkyl sulfonate anions. Specifically useful anions include trifluoromethyl sulfonates and perfluorobutyl sulfonates. Combinations of the foregoing may also be present.

Phosphonium cations include tetrasubstituted phosphonium cations substituted with organic $C_{1-22}$ groups such as $C_{1-22}$ alkyl groups, $C_{6-22}$ aryl groups, $C_{7-22}$ aralkyl groups, or combinations of these groups. The $C_{1-22}$ groups may themselves be substituted with groups including halogens such as fluorine, chlorine, and bromine; nitrile; nitro; $C_{6-10}$ aryl groups, carboxylic acids and derivatives including esters and amides; amines; hydroxy groups; or the like. In a specific embodiment, the cation is a tetra($C_{1-22}$ alkyl)phosphonium cation. Examples of specific phosphonium cations substituted with $C_{1-22}$ groups include tetramethyl phosphonium, tetraethyl phosphonium, tetra-n-propyl phosphonium, tetraisopropyl phosphonium, tetrabutyl phosphonium, triethylmethyl phosphonium, tributylmethyl phosphonium, tributylethyl phosphonium, trioctylmethyl phosphonium, trimethylbutyl phosphonium, trimethyloctyl phosphonium, trimethyllauryl phosphonium, trimethylstearyl phosphonium, triethyloctyl phosphonium, trimethylbenzyl phosphonium, triethylbenzyl phosphonium, tributylbenzyl phosphonium, tetraphenyl phosphonium, triphenylmethyl phosphonium, and triphenylbenzyl phosphonium. Combinations of the foregoing may also be present.

Perfluoroalkyl sulfonate phosphonium salts that may be used herein thus include those having the general formula (17):

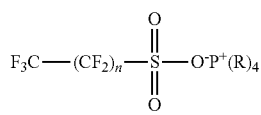

(17)

wherein n is an integer of 0 to about 7, and each R is $C_{1-22}$ alkyl group, $C_{6-22}$ aryl group, $C_{7-22}$ aralkyl group, or combinations of these groups. In one embodiment, three of the R groups in the phosphonium cation may be the same R group selected from $C_{1-8}$ alkyl group, $C_{6-10}$ aryl group, or combinations of these groups, while the fourth R group is different from the first three and may be a $C_{7-22}$ aralkyl group or $C_{1-22}$ alkyl group. The perfluoroalkyl sulfonate phosphonium salts are generally low melting semi-solid materials, and as such, they may be handled as a molten liquid. In some embodiments, the salts are solid crystalline materials at room temperature (about 15 to about 25° C.) and are easy to weigh, handle, and add to the above-described thermoplastic composition.

In an exemplary embodiment, the perfluoroalkyl sulfonate phosphonium salt antistatic agent may be the phosphonium salt of perfluorobutyl sulfonate, having the following formula (18):

$$CF_3—(CF_2)_3—SO_3^{-+}P(C_4H_9)_4 \qquad (18)$$

and referred to as tetrabutyl phosphonium perfluorobutyl sulfonate, commercially available from DuPont Specialty Chemicals under the tradename ZONYL® FASP-1.

In an embodiment, the perfluoroalkyl sulfonate phosphonium salt is present in the thermoplastic composition in an amount of 0.001 to 1.0 parts by weight, based on 100 parts by weight of the polycarbonate (on a weight basis). In a specific embodiment, the perfluoroalkyl sulfonate phosphonium salt is present in the thermoplastic composition in an amount of 0.001 to 0.9 parts by weight, specifically 0.001 to 0.8 parts by weight, and more specifically 0.01 to 0.7 parts by weight, and still more specifically 0.1 to 0.6 parts by weight based on 100 parts by weight of the polycarbonate.

In addition to the perfluoroalkyl sulfonate phosphonium salt, the thermoplastic composition includes a non-phosphonium perfluoroalkyl sulfonate salt as an antistatic enhancer for the antistatic agent. The non-phosphonium perfluoroalkyl sulfonate salt used as the antistatic enhancer is a highly halogenated alkyl sulfonate salt, and specifically comprises a perfluoroalkyl sulfonate anion and a non-phosphonium cation.

Non-phosphonium perfluoroalkyl sulfonate salts that may be used herein thus include those having the general formula (19):

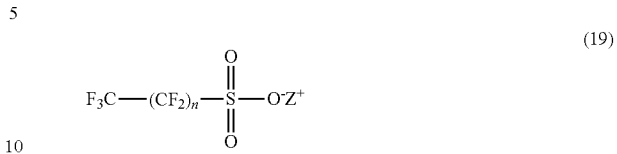

(19)

wherein n is an integer of 0 to about 7, and $Z^+$ is a non-phosphonium cation. Where $Z^+$ is a mono-, di-, tri-, or tetra-$C_{1-22}$ alkylammonium cation of formula $NR'_4{}^+$, each R' is $C_{1-22}$ alkyl group, $C_{6-22}$ aryl group, $C_{7-22}$ aralkyl group, or combinations of these groups. The $C_{1-22}$ alkyl groups of R' may themselves be substituted with groups including halogens such as fluorine, chlorine, and bromine; nitrile; nitro; $C_{6-10}$ aryl groups, carboxylic acids and derivatives including esters and amides; amines, hydroxy groups; or the like. In one embodiment, three of the R' groups in the alkylammonium cation may be the same R' group selected from $C_{1-8}$ alkyl group, $C_{6-10}$ aryl group, or combinations of these groups, while the fourth R' group is different from the first three and may be a $C_{7-22}$ aralkyl group or $C_{1-22}$ alkyl group.

The non-phosphonium cation $Z^+$ of the non-phosphonium perfluoroalkyl sulfonate salt of formula (19) can comprise an alkali metal cation, an alkaline earth metal cation, a transition metal cation, an ammonium cation, a mono-, di-, tri- or tetra-$C_{1-22}$ alkylammonium cation, a pyridinium cation, or a combination comprising at least one of the foregoing cations can be used. Examples of the non-phosphonium cations include lithium, sodium, potassium, cesium, rubidium, ammonium, tetramethyl ammonium, trimethylbenzyl ammonium, tetraethylammonium, tetrabutylammonium, cetylammonium, pyridinium, or a combination comprising at least one of the foregoing cations.

The perfluoroalkyl sulfonate anion for the non-phosphonium perfluoroalkyl sulfonate salt also comprises a $C_{1-22}$ perfluoroalkyl sulfonate anion, and is as described hereinabove for the non-phosphonium perfluoroalkyl sulfonate salt.

In an exemplary embodiment, the non-phosphonium perfluoroalkyl sulfonate salt comprises potassium perfluoromethyl sulfonate (also referred to as potassium trifluoromethyl sulfonate) of formula (19a), $$CF_3—SO_3^{-+}K \qquad (19a)$$

or potassium perfluorobutyl sulfonate of formula (19b), $$CF_3—(CF_2)_3—SO_3^{-+}K \qquad (19b)$$

or a combination comprising at least one of these. Potassium perfluorobutyl sulfonate (known as both Rimar salt and C4 Rimar) and potassium perfluoromethyl sulfonate (known as C1 Rimar), both known for having flame retardant properties, can both be used to enhance the antistatic performance of perfluoroalkyl sulfonate phosphonium salts. C4 Rimar and C1 Rimar are each available from 3M.

The non-phosphonium perfluoroalkyl sulfonate salt is present in the thermoplastic composition in an amount of less than or equal to 0.2 parts by weight, based on 100 parts by weight of the polycarbonate. In an embodiment, the non-phosphonium perfluoroalkyl sulfonate salt is present in the thermoplastic composition in an amount of less than 0.16 parts by weight, based on 100 parts by weight of the polycarbonate (on a weight basis). In a specific embodiment, the non-phosphonium perfluoroalkyl sulfonate salt is present in the thermoplastic composition in an amount of 0.01 to 0.16 parts by weight, specifically 0.01 to 0.10 parts by weight, and more specifically 0.01 to 0.08 parts by weight, based on 100 parts by weight of the polycarbonate. In an exemplary embodiment, potassium perfluorobutyl sulfonate is present in the thermoplastic composition in amounts of 0.08 to 0.16 parts by weight, based on 100 parts of polycarbonate. In another exemplary embodiment, potassium perfluoromethyl sulfonate is present in the thermoplastic composition in amounts of 0.03 to 0.06 parts by weight, based on 100 parts by weight of polycarbonate.

It has been unexpectedly found that improved antistatic properties can be imparted to polycarbonate compositions by incorporating small amounts of non-phosphonium perfluoroalkyl sulfonate salts as antistatic enhancers, such as potassium perfluorobutyl sulfonate and/or potassium perfluoromethyl sulfonate, along with an antistatic agent such as a perfluoroalkyl sulfonate phosphonium salts.

A measure of the antistatic properties can be found in the surface resistivity of an article molded from the thermoplastic composition including polycarbonate and the combination of non-phosphonium perfluoroalkyl sulfonate and perfluoroalkyl sulfonate phosphonium salt. Unexpectedly, inclusion of small amounts (i.e., about 0.2 parts per hundred or less) of the non-phosphonium perfluoroalkyl sulfonate was found to decrease the surface resistivity (measured in ohms using a probe station dedicated to dielectric testing, under controlled conditions of 23° C. heat and 50% relative humidity) to within about $10^{10}$ to about $10^{14}$ ohms for the article molded from the thermoplastic composition. A minimum surface resistivity of about $10^{10}$ ohms for the thermoplastic composition, which is lower than the minimum surface resistivity of about $10^{11}$ ohms observed for a polycarbonate in combination with the antistatic agent alone (in amounts of 1.1 wt % or greater), may be obtainable by inclusion of the antistatic enhancer with the antistatic agent. It has been found that, while increasing the amount of perfluoroalkyl sulfonate phosphonium salt antistatic agent (e.g., tetrabutyl phosphonium perfluorobutyl sulfonate) in a molded article up to about 1.1 wt % (based on the weight of polycarbonate and antistatic agent), the surface resistivity decreases to about $10^{11}$ ohms. Further increasing the amount of antistatic agent to amounts greater than 1.1 wt % has little further effect as the surface resistivity appears to reach a threshold lower limit at about $10^{11}$ ohms, and therefore inclusion of additional antistatic agent does not substantially further decrease the surface resistivity of the article. However, inclusion of the antistatic enhancer has been found to decrease the surface resistivity of polycarbonate compositions with antistatic agent by at least about an order of magnitude, and therefore including the antistatic enhancer can be expected to decrease the minimum surface resistivity of a molded or extruded article prepared using both the antistatic agent and the antistatic enhancer by about the same relative amount, i.e., to about $10^{10}$ ohms, thereby providing improved antistatic characteristics. Inclusion of the antistatic enhancer may therefore also be useful to reduce the overall amount of antistatic agent needed to achieve an equivalent surface conductivity.

In addition, the surface resistivity for an article molded from the thermoplastic composition was reduced by an amount greater than or equal to 20% relative to an article molded from a comparative thermoplastic composition prepared using the same polycarbonate and the same type and amount of perfluoroalkyl sulfonate phosphonium salt (e.g., 0.3 to 0.6 phr), but without the non-phosphonium perfluoroalkyl sulfonate salt present. In a specific embodiment, the article molded from the thermoplastic composition has, under these comparative conditions, a decrease in surface resistivity of greater than or equal to 30%, specifically greater than or equal to 40%, and more specifically greater than or equal to 43%, when compared to an article molded from a comparative thermoplastic composition without non-phosphonium perfluoroalkyl sulfonate salt. The reduced surface resistivity thereby enables charge to bleed off more rapidly than for an article prepared from the comparative thermoplastic composition unenhanced by inclusion of the non-phosphonium perfluoroalkyl sulfonate salt, thereby improving the properties of articles molded form the thermoplastic composition and avoiding the undesirable consequences accompanying accumulation of static charge, such as attraction of dust and static "cling" in which charged objects adhere to one another due to the charge attraction.

Also surprisingly, as found using X-ray photoelectron spectroscopy (XPS), the surface region of a test article molded from the thermoplastic composition including polycarbonate, perfluoroalkyl sulfonate phosphonium salt, and non-phosphonium perfluoroalkyl sulfonate salt as the antistatic enhancer is unexpectedly enriched at the surface of the test article to a depth of at least about 5 nm, in elements associated with either or both of the above perfluoroalkyl sulfonate compounds (e.g., fluorine, phosphorus, etc.), that is higher than expected relative to the theoretical amount that would be expected. The theoretical basis for comparison is as follows. It would be expected that for an article molded from a polycarbonate-containing composition having a weight basis amount a of perfluoroalkyl sulfonate phosphonium salt, and amount b of non-phosphonium perfluoroalkyl sulfonate salt such that the total amount of perfluoroalkyl compounds present is a+b, that the expected (theoretical) amount of an element such as fluorine that is diagnostic of perfluoroalkyl compounds would be the additive value of the surface fluorine content (determined by XPS) for a comparative article molded from a thermoplastic composition of polycarbonate containing an amount a of perfluoroalkyl sulfonate phosphonium salt, plus the surface fluorine content (determined by XPS) for a comparative article molded from a thermoplastic composition of polycarbonate containing an amount b of the non-phosphonium perfluoroalkyl sulfonate salt. It has been found, however, that under such compositional constraints, the surface content of fluorine for a test article prepared from polycarbonate and a combination of perfluoroalkyl sulfonate phosphonium salt and non-phosphonium perfluoroalkyl sulfonate salt increases significantly, by up to about 20% relative to the theoretical comparative (or by an absolute measured difference of up to about 1.5% higher or more as measured by XPS). This clearly indicates that one or more perfluoroalkyl species, either perfluoroalkyl sulfonate phosphonium salt, non-phosphonium perfluoroalkyl sulfonate salt, or both, has achieved enhanced mobility to the surface of the article, during molding, extruding, or other processing of the article, only when the combination of perfluoroalkyl sulfonate phosphonium salt and non-phosphonium perfluoroalkyl sulfonate salt is used.

Also unexpectedly, the haze of the resulting thermoplastic compositions has been found to be lower, and in some embodiments, is consistently less than about 1%, whereas the amount of haze typically observed when only the non-phosphonium perfluoroalkyl sulfonate salt is included with the polycarbonate is significantly higher (e.g., about 46% at levels of 0.16 phr for C4 Rimar). The combination of the antistatic agent with the non-phosphonium perfluoroalkyl sulfonate salt therefore has a synergistic effect on the above properties. In addition, the synergistic interaction of a flame retardant antistatic enhancer (e.g., C4 Rimar) can in principle be used to increase the effective C4 Rimar concentration in flame retardant formulations to yield low haze polycarbonate compositions having superior flame retardant performance, where the antistatic agent chosen has a neutral or positive effect toward the net flame retardant properties.

Thus, in an embodiment, a thermoplastic composition comprises a polycarbonate, a perfluoroalkyl sulfonate phosphonium salt, and a non-phosphonium perfluoroalkyl sulfonate salt. In an embodiment, an article molded from the thermoplastic composition and having a thickness of 3.18 millimeters has a haze of 0.01 to 1.0%, specifically 0.1 to 0.8%, more specifically 0.1 to 0.5%, and still more specifically 0.1 to 0.4% according to ASTM D1003-00. Also in an embodiment, an article molded from the thermoplastic composition and having a thickness of 3.18 millimeters has a percent transmission of greater than or equal to 80%, specifically greater than or equal to 85%, and still more specifically greater than or equal to 89%, according to ASTM D1003-00. In another embodiment, an article molded from the thermoplastic composition and having a thickness of 3.18 millimeters has a yellowness index (YI) of less than or equal to 0.1 to 3, specifically 0.2 to 2.8, and more specifically 0.25 to 2.5 according to ASTM D1925-70.

In an embodiment, a molded flat disk prepared from the thermoplastic composition has a surface resistivity of $1.0 \times 10^{10}$ to $1.0 \times 10^{14}$ ohms, specifically $1.0 \times 10^{11}$ to $1.0 \times 10^{14}$ ohms, more specifically $1.0 \times 10^{12}$ to $1.0 \times 10^{14}$ ohms, and still more specifically $1.0 \times 10^{12}$ to $1.0 \times 10^{13}$ ohms. Also in an embodiment, a molded flat disk prepared from the thermoplastic composition has a static decay time for positive charge of 0.1 to 6 seconds, specifically 0.5 to 5.5 seconds, and more specifically about 1 to 5 seconds, and a static decay time for negative charge of 0.1 to 7 seconds, specifically 0.5 to 6.5 seconds, and more specifically 1 to 6 seconds. Surface resistivity and static decay time measurements are desirably taken at an ambient temperature of 23±2° C. and at 50±1% relative humidity.

In an embodiment, the thermoplastic composition has an MVR of about 3 to about 80 cc/10 min., specifically about 4 to about 70 cc/10 min, more specifically about 5 to about 60 cc/10 min, and still more specifically about 5 to about 50 cc/10 min., measured at 300° C. and a load of 1.2 kilograms according to ASTM D1238-04.

Antistatic thermoplastic compositions comprising a polycarbonate and fluorinated phosphonium sulfonates of formulas (17) and (19) as the principal components thereof may be used in many different ways to make use of their antistatic properties, compatibility, transparency, and heat resistance characteristics, for example, in providing such antistatic characteristics to combinations with other thermoplastic resins, provided that the inclusion of the other thermoplastic resins do not significantly adversely affect the desired properties of the thermoplastic composition. Other thermoplastic resins may include but are not limited to polyetherimide, polyester, polyphenylene ether/polystyrene blends, polyamides, polyketones, polyesters including polyarylates, or combinations comprising at least one of the foregoing polymers. Alternatively, the antistatic compositions may be used to impart the same desirable properties to one or more of these other thermoplastic resins in the absence of polycarbonate. In addition to the polycarbonate and any thermoplastic resins, the thermoplastic composition may further include various other additives ordinarily incorporated with thermoplastic compositions of this type, with the proviso that the additives are selected so as not to adversely affect the desired properties of the thermoplastic composition. Mixtures of additives may be used. Such additives may be mixed at a suitable time during the mixing of the components for forming the thermoplastic composition. Useful additives contemplated herein include, but are not limited to, impact modifiers, fillers, colorants including dyes and pigments, antioxidants, heat stabilizers, light and/or UV light stabilizers, plasticizers, lubricants, mold release agents, additional antistatic agents not identical to those disclosed hereinabove, flame retardants, anti-drip agents, radiation stabilizers, and the like.

While it is contemplated that other resins and or additives may be used in the thermoplastic compositions described herein, such additives while desirable in some embodiments are not essential.

The thermoplastic composition may be manufactured by methods generally available in the art, for example, in one embodiment, in one manner of proceeding, polycarbonate, perfluoroalkyl sulfonate phosphonium salt and non-phosphonium perfluoroalkyl sulfonate salt, and other optional components, are optionally first blended in a HENSCHEL-Mixer® high speed mixer. Other low shear processes including but not limited to hand mixing may also accomplish this blending. The blend may then be fed into the throat of an extruder via a hopper. Alternatively, in a specific embodiment, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic composition comprises melt combining a polycarbonate, perfluoroalkyl sulfonate phosphonium salt and non-phosphonium perfluoroalkyl sulfonate salt, and any additional polymers or further additives. The melt combining can be done by extrusion. In an embodiment, the proportions of polycarbonate, perfluoroalkyl sulfonate phosphonium salt and non-phosphonium perfluoroalkyl sulfonate salt, any additional polymer, and any further additives are selected such that the antistatic properties of the thermoplastic composition and articles subsequently molded therefrom are maintained at a desirable level and not significantly adversely affected.

In a specific embodiment, the extruder is a twin-screw extruder. The extruder is typically operated at a temperature of 180 to 385° C., though it is within the capability of one skilled in the art to select operating conditions for optimum mixing without degradation of the components. In an embodiment, a temperature profile of 230 to 290° C. may be used for extrusion, wherein the die temperature may be different. In an embodiment, the die temperature is 290 to 300° C. The extruded thermoplastic composition is quenched in water followed by pelletization.

Shaped, formed, or molded articles comprising the thermoplastic compositions are also provided. The thermoplastic compositions may be molded into useful shaped articles by a variety of means such as injection molding, extrusion, rotational molding, blow molding and thermoforming. In a specific embodiment, molding is done by injection molding. In another specific embodiment, the thermoplastic composition is extruded.

In an embodiment, articles prepared from the polycarbonate, perfluoroalkyl sulfonate phosphonium salt, and non-phosphonium perfluoroalkyl sulfonate salt, has desirable surface resistivity, and a haze value of 0.01 to 1.0%, as measured according to ASTM D1003-00 at 3.18 millimeters thickness. In another embodiment, including the antistatic enhancer constitutes a method of reducing the surface charge of an article prepared from the thermoplastic composition, wherein the method comprises combining a non-phosphonium perfluoroalkyl sulfonate salt and a combination of a polycarbonate and a perfluoroalkyl sulfonate phosphonium salt prior to forming the article (i.e., prior to extrusion, molding, etc.). The article prepared from the thermoplastic composition has the desired surface resistivity, and desirably low static decay time for both positive and negative charges.

The thermoplastic composition is useful to form an article such as, for example, an extruded article such as a film, sheet, or fiber, or alternatively an opaque or transparent molded article. In an embodiment, the film or sheet may have one or more layers that are the same or different. Specific articles and uses include automotive parts including transparent parts such as a headlight or other lens; in electronic appliances such as films and sheets for use in backlight modules of a Liquid Crystal Display (LCD); and optical recording media (compact discs, digital video discs, blu-ray discs, and the like).

The thermoplastic composition is further illustrated by the following non-limiting examples.

Thermoplastic compositions for the examples (abbreviated Ex. in the following tables) and comparative examples (abbreviated CEx. in the following tables) were prepared using the individual components described in Table 1. All thermoplastic compositions are blends of polycarbonate resin with components included in the indicated proportions (phr: parts per hundred parts resin, by weight) as listed in Tables 2-5 below. Pellets of the thermoplastic composition were compounded and extruded using a Werner and Pfleiderer ZSK 30 mm twin-screw compounder at a temperature profile of 230° C. to 290° C. The twin-screw compounder had enough distributive and dispersive mixing elements to produce good mixing of the compositions. Pellets obtained by the compounder were injection molded on a Van Dorn 85T injection-molding machine at a temperature of 295° C. into 4 inch (10 cm) diameter flat discs having a thickness of 125 mil (3.18 mm). Pellets were also extruded into 7 mil (175 μm) thick films. It will be noted that pigments as listed in Table 1, below and where included in the following examples or comparative examples, are optionally included and have no effect on the antistatic performance but are included as a colorant only. In addition, it will also be noted that water included in the blends is for purposes of improving color of the resultant compositions during processing (compounding) and as with the pigments above, does not affect the antistatic performance of the resulting thermoplastic compositions.

Properties of the thermoplastic compositions were determined as follows. Surface resistivity measurements were performed at 23±2° C. and 50±1% relative humidity on 4 inch (10 cm) diameter flat discs having a thickness of 125 mil (3.18 mm) as described above, or 7 mil (175 μm) thick films using a Keithley Model 6517 Electrometer/High Resistance Meter. All samples were kept at 23±2° C. and 50±1% humidity conditions for at least 48 hrs prior to measurements. Static decay measurements were performed under the same temperature and relative humidity conditions as surface resistivity. The charging potential was +/−5 kV. Results are represented as the time required by a charged test sample to discharge to the 10% cutoff level.

Optical properties such as total light transmission (%) and haze (%) were measured using 3.18 mm thick molded plaques in accordance with ASTM D1003-00. Yellowness index (YI) was measured using 3.18 mm thick molded plaques in accordance with ASTM D1925-70. Melt flow of the pellets was measured at 300° C. under a load of 1.2 kg according to ASTM D-1238-04 and is reported in units of cc/10 min after a 6 min. dwell time.

Surface composition was measured on molded 1 cm×1 cm samples with a thickness of 3.18 mm by X-ray photoelectron spectroscopy, using a Quantum 2000 XPS spectrometer instrument from Physical Electronics Inc., equipped with AlKα X-ray source and an Argon+ ion gun. This method provides a quantitative identification of all elements except hydrogen located within the surface (about 2 to about 10 nm). The detection limit is about 0.1% atomic concentration.

TABLE 1

| Component | Description | Supplier |
|---|---|---|
| PC | LEXAN ® polycarbonate resin powder (Mw = 29,900 g/mol) | SABIC Innovative Plastics |
| C1 Rimar | potassium perfluoromethyl sulfonate | 3M |
| C4 Rimar | potassium perfluorobutyl sulfonate | 3M |
| Antistatic agent | tetrabutyl phosphonium perfluorobutyl sulfonate (ZONYL ® FASP-1) | DuPont Specialty Chemicals |
| Mold Release Agent | GLYCOLUBE ® release agent (Pentaerythritol Tetrastearate; PETS) | Lonza |
| Heat Stabilizer | IRGAFOS ® antioxidant | Ciba Specialty Chemicals |
| Pigment 1 | 1,8-bis-(p-toluidino)-9,10-anthraquinone (Solvent Violet 36) | Lanxess |
| Pigment 2 | Copper Phthalocyanine Pigment (Pigment Blue 15:4) | Sun Chemical |

Examples 1-4 and Comparative Examples 1-5

The following Examples and Comparative Examples were prepared according to the above-described method, using the proportions detailed in Table 2 (below), to demonstrate the improvement in static dissipative properties of polycarbonate compositions containing an antistatic agent and perfluoroalkyl sulfonate salt. All data was obtained using molded flat discs as described above.

TABLE 2

| Component | CEx. 1 | CEx. 2 | CEx. 3 | CEx. 4 | CEx. 5 | Ex. 1 | Ex. 2 | Ex. 3 | Ex. 4 |
|---|---|---|---|---|---|---|---|---|---|
| PC (phr) | 100 | 100 | 100 | 100 | 100 | 100 | 100 | 100 | 100 |
| Mold Release agent (phr) | 0.145 | 0.145 | 0.145 | 0.145 | 0.145 | 0.145 | 0.145 | 0.145 | 0.145 |
| Heat Stabilizer (phr) | 0.06 | 0.06 | 0.06 | 0.06 | 0.06 | 0.06 | 0.06 | 0.06 | 0.06 |
| Water (phr) | 0.10 | 0.10 | 0.10 | 0.10 | 0.10 | 0.10 | 0.10 | 0.10 | 0.10 |
| Antistatic agent (phr) | — | 0.30 | 0.60 | — | — | 0.30 | 0.30 | 0.60 | 0.60 |

TABLE 2-continued

| Component | CEx. 1 | CEx. 2 | CEx. 3 | CEx. 4 | CEx. 5 | Ex. 1 | Ex. 2 | Ex. 3 | Ex. 4 |
|---|---|---|---|---|---|---|---|---|---|
| C4 Rimar (phr) | — | — | — | 0.08 | 0.16 | 0.08 | 0.16 | 0.08 | 0.16 |
| MVR @ 6 min (cc/10 min.) | 6.64 | 6.69 | 7.33 | 6.71 | 6.74 | 7.23 | 7.18 | 6.96 | 8.12 |
| % Transmittance | 89.13 | 89.35 | 89.40 | 89.10 | 68.21 | 89.47 | 72.83 | 89.44 | 81.32 |
| % Haze | 0.50 | 0.35 | 0.24 | 0.91 | 45.99 | 0.28 | 33.51 | 0.46 | 10.55 |
| YI | 2.09 | 2.07 | 1.98 | 2.31 | 13.02 | 1.83 | 11.34 | 1.92 | 7.80 |
| Surface Resistivity (ohms) | $2.53 \times 10^{17}$ | $2.10 \times 10^{16}$ | $1.29 \times 10^{13}$ | $8.91 \times 10^{17}$ | $1.18 \times 10^{18}$ | $8.46 \times 10^{15}$ | $4.93 \times 10^{13}$ | $6.96 \times 10^{12}$ | $1.89 \times 10^{12}$ |
| Static Decay Time - Positive Charge (sec.) | >100 | >100 | 13.47 | >100 | >100 | >100 | 70.37 | 4.86 | 3.18 |
| Static Decay Time - Negative Charge (sec.) | >100 | >100 | 15.86 | >100 | >100 | >100 | 84.73 | 5.91 | 3.74 |
| Surface composition by XPS: | | | | | | | | | |
| % C | 83.72 | 79.06 | 70.52 | 82.83 | 77.03 | 77.26 | 72.02 | 68.47 | — |
| % O | 16.03 | 14.55 | 12.69 | 16.04 | 17.02 | 14.40 | 15.05 | 12.57 | — |
| % F | 0 | 5.32 | 14.52 | 0.73 | 5.24 | 7.25 | 11.45 | 16.68 | — |
| % P | 0.23 | 0.50 | 1.00 | 0.21 | 0.28 | 0.59 | 0.60 | 1.05 | — |
| % S | 0.01 | 0.55 | 1.23 | 0.19 | 0.41 | 0.49 | 0.88 | 1.21 | — |

Table 2 shows the antistatic properties, optical properties, rheology data, and surface composition for the antistatic polycarbonate compositions with and without C4 Rimar.

C4 Rimar, the non-phosphonium perfluoroalkyl sulfonate salt, does not by itself (CEx. 4 and 5) impart any antistatic properties to the polycarbonate compositions as seen when comparing the surface resistivity and the static decay time data of CEx. 4 and 5 with CEx 1. Surface resistivities for these comparative examples are in the range of $10^{18}$ to $10^{17}$ ohm, and approximately the same as that of CEx. 1 which lacks both antistatic agent and non-phosphonium perfluoroalkyl sulfonate salt, and the decay times are greater than 100 sec, which are typical values for insulator materials. Further, it should be noted that at 0.16 phr C4 Rimar, the composition becomes hazy (CEx 5; haze of about 46%).

The attached FIGURE comparatively illustrates the lower limit of surface resistivity that can be obtained using only increasing amounts of a perfluoroalkyl sulfonate phosphonium salt, without inclusion of an enhancer. For the compositions shown in the plot (which comprise only polycarbonate and the antistatic agent, with an increase in the loading level of antistatic agent from 0 wt % to 1.75 wt % antistatic agent (ZONYL®FASP-1), as expected, the surface resistivity decreases, thus exhibiting better antistatic characteristics. At one point however, the surface resistivity reaches a threshold for the lower limit. This is clearly shown in the FIGURE at about 1.1 wt % antistatic agent, where the slope of surface resistivity decay changes significantly. As the antistatic concentration is increased beyond 1.1 wt %, there is only a slight further decrease in surface resistivity. Therefore, as seen in the data, the minimum surface resistivity that can be reached by use of a perfluoroalkyl sulfonate phosphonium salt as antistatic additive alone is about $10^{11}$ ohms.

Incorporation of C4 Rimar into a composition that already contains an antistatic agent thus enhances the antistatic characteristics. For compositions having the same amount of antistatic additive, the surface resistivity is reduced by about one or two orders of magnitude when C4 Rimar is added. This can be seen in a comparison of CEx. 2 with Ex. 1 and Ex. 2, and in a comparison of CEx. 3 with Ex. 3 and Ex. 4.

C4 Rimar incorporated into a polycarbonate composition along with an antistatic agent shows significantly enhanced antistatic characteristics, where the higher the concentration of C4 Rimar (up to about 0.16 phr), the lower the surface resistivity and static decay times, and hence the better the static dissipative property of the composition. This is seen in a comparison of Exs. 1 and 2 with CEx. 2, and in a comparison of Exs. 3 and 4 with CEx. 3. The % reduction in surface resistivity is calculated according to equation 1:

$$\% \text{ reduction in surface resistivity} = [1 - (\Omega_{rs\&aa}/\Omega_{aa})] \times 100 \qquad (\text{eq. 1})$$

where $\Omega_{rs\&aa}$ is the surface resistivity for a composition including both an antistatic enhancer (i.e., a non-phosphonium perfluoroalkyl sulfonate salt such as C4 Rimar) and an antistatic agent, and $\Omega_{aa}$ is the surface resistivity for a composition only having the antistatic agent, for examples and comparative examples having the same concentrations of antistatic agent and differing only by the inclusion of the antistatic enhancer. In this instance, for added C4 Rimar, the surface resistivity of Ex. 1 decreases by 59.7% relative to CEx. 2; Ex. 2 decreases by 99.7% relative to CEx. 2; Ex. 3 decreases by 59.7% relative to CEx. 3; and Ex. 4 decreases by 85.4% relative to CEx. 3.

In addition, the static decay times for the examples containing C4 Rimar in addition to the antistatic agent also decreases. For example, comparing CEx. 2 with Ex. 2 where 0.16 phr of C4 Rimar is used with 0.3 phr of antistatic agent, the positive charge decay time is about 30 seconds faster, and the negative charge decay time, about 15 seconds faster. Comparing CEx. 3 with Ex. 3 where 0.08 phr of C4 Rimar is used with 0.6 phr of antistatic agent, the positive charge decay time is about 8.6 seconds faster, and the negative charge decay time, about 10.0 seconds faster. And, comparing CEx. 3 with Ex. 4 where 0.16 phr of C4 Rimar is used with 0.6 phr of antistatic agent, the positive charge decay time is about 10.3 seconds faster, and the negative charge decay time, about 12.1 seconds faster. There is therefore an appreciable decrease in the time needed to discharge the surface charge where C4 Rimar is included. Low haze and high transmission are retained in the samples with the addition of 0.08 phr C4 Rimar (Ex. 1 and Ex. 3).

Surprisingly, a composition with 0.16 phr C4 Rimar (which when used alone exhibits high haziness; CEx. 5), displays improved optical properties when in the presence of antistatic agent. This is seen in a comparison of CEx. 5 with Ex. 4. For example, the haze diminishes from about 46% to about 10.5% by adding 0.6 phr antistatic agent. In transparent flame retardant polycarbonate compositions, C4 Rimar is generally used in concentrations less than 0.1 phr, as higher levels can cause increased haze.

Surface composition was additionally measured by XPS on 1 cm×1 cm square samples having a thickness of 3.18 mm. The data are also shown in Table 2.

As seen in Table 2, CEx. 1 contains neither antistatic agent nor C4 Rimar and therefore no fluorine is detected in the top 5 nm (approximately) of surface. However, fluorine is detected in the antistatic-containing compositions (CExs. 2 and 3) as well as in the C4 Rimar-containing formulations (CExs. 4 and 5).

It would be expected that adding a fluorinated antistatic enhancer (e.g., C4 Rimar) to an antistatic-containing composition would increase the amount of fluorine present at the top surface in a straightforward additive manner, based on a linear increase in the weight percentage of fluorinated species present. For instance, for the 0.3 phr antistatic formulation, adding 0.08 phr C4 Rimar (Ex. 1) one would expect according to the simple additive model, that the surface amount of fluorine would be measured at about 6.05% (i.e., the expected value being the sum of 5.32% from CEx. 2 plus 0.73% from CEx. 4). However, a fluorine level that is significantly higher than expected is observed for Ex. 1 at 7.25%, which is an absolute increase (as measured) of about 1% F over the expected value, which is a relative increase of 19.8% (calculated as $1-[\%\text{ F (measured)}/\%\text{ F(expected)}]\times 100 = 1-[7.25\%/6.05\%]\times 100 = 19.8\%$ relative increase over the expected % F). The inclusion of C4 Rimar thus also apparently enhances the migration of antistatic agent to the top surface, such that in the case of Ex. 1, about 20% more fluorine, and associated antistatic enhancer or additive, collects within 5 nm of the surface. Similarly, this effect can also be seen in Ex. 2: applying an additive model, one would expect % F to be about 10.56% (i.e., the sum of 5.32% as in CEx. 2 plus 5.24% from CEx. 5). However, the amount of fluorine measured by XPS is significantly higher at 11.45%, an absolute measured increase of 0.89% F over the calculated value, which represents an 8.4% increase relative to the calculated value. Similarly, the trend can also be seen for inclusion of 0.6 phr of antistatic-containing composition with 0.08 phr C4 Rimar (Ex. 3). Again applying the above additive model, one would expect a surface fluorine content of about 15.25% F (i.e., the sum of 14.52% F from CEx. 3 plus 0.73% F from CEx. 4). However, as seen in the XPS data for Ex. 3, an amount of fluorine significantly higher than expected is measured at 16.68% F a measured increase of 1.43% F over the calculated value, which represents a 9.4% increase relative to the calculated value.

The positive effect that C4 Rimar has on the antistatic migration to the top surface, as demonstrated by these XPS data, thus correlates well with the improved (i.e., reduced) surface resistivity and static decay time data presented in Table 2.

Comparative Example 6 and Example 3

C4 Rimar was also evaluated for use as an antistatic enhancer in combination with the antistatic agent in a polycarbonate film (<200 μm thickness). In particular, the composition of Ex. 3, and that of CEx. 6, were each extruded into films having thicknesses of 7 mil (175 μm), the data for which is shown in Table 3.

TABLE 3

| Component | CEx. 6 | Ex. 3 |
|---|---|---|
| PC (phr) | 100 | 100 |
| Mold Release agent (phr) | 0.145 | 0.145 |
| Heat Stabilizer (phr) | 0.06 | 0.06 |
| Water (phr) | 0.10 | 0.10 |
| Antistatic agent (phr) | 0.62 | 0.60 |
| C4 Rimar (phr) | — | 0.08 |
| Pigment 1 | $6.7 \times 10^{-5}$ | — |
| Pigment 2 | $2.4 \times 10^{-5}$ | — |
| Surface Resistivity (ohms) | $9.77 \times 10^{13}$ | $1.07 \times 10^{13}$ |
| Static Decay Time - Positive Charge (sec.) | 6.18 | 3.88 |
| Static Decay Time - Negative Charge (sec.) | 7.06 | 4.43 |

As seen in Table 3, the film made of a composition comprising C4 Rimar plus antistatic agent (Ex. 3) exhibits 89.1% reduction in surface resistivity, and lower static decay times for both positive and negative charges than the film made of a composition containing only the antistatic agent (CEx. 6). The low levels of pigments 1 and 2 in CEx. 6 have little or no apparent effect on surface charge and decay times when compared to the use of C4 Rimar in Ex. 3.

Examples 5-8 and Comparative Examples 1-3 and 7-8

Similar to C4 Rimar, the potassium perfluoromethyl sulfonate (C1 Rimar) was also found to be useful as an efficient antistatic enhancer for use with the polycarbonate compositions comprising an antistatic agent such as tetrabutyl phosphonium perfluorobutyl sulfonate. The compositions and accompanying results are reported in Table 4.

TABLE 4

| Component | CEx. 1 | CEx. 2 | CEx. 3 | CEx. 7 | CEx. 8 | Ex. 5 | Ex. 6 | Ex. 7 | Ex. 8 |
|---|---|---|---|---|---|---|---|---|---|
| PC (phr) | 100 | 100 | 100 | 100 | 100 | 100 | 100 | 100 | 100 |
| Mold Release agent (phr) | 0.145 | 0.145 | 0.145 | 0.145 | 0.145 | 0.145 | 0.145 | 0.145 | 0.145 |
| Heat Stabilizer (phr) | 0.06 | 0.06 | 0.06 | 0.06 | 0.06 | 0.06 | 0.06 | 0.06 | 0.06 |
| Water (phr) | 0.10 | 0.10 | 0.10 | 0.10 | 0.10 | 0.10 | 0.10 | 0.10 | 0.10 |
| Antistatic agent (phr) | — | 0.30 | 0.60 | — | — | 0.30 | 0.30 | 0.60 | 0.60 |
| C1 Rimar | — | — | — | 0.03 | 0.06 | 0.03 | 0.06 | 0.03 | 0.06 |
| MVR @ 6 min (cc/10 min) | 6.64 | 6.69 | 7.33 | 6.54 | 8.36 | 6.77 | 7.04 | 7.06 | 7.78 |

TABLE 4-continued

| Component | CEx. 1 | CEx. 2 | CEx. 3 | CEx. 7 | CEx. 8 | Ex. 5 | Ex. 6 | Ex. 7 | Ex. 8 |
|---|---|---|---|---|---|---|---|---|---|
| % Transmittance | 89.13 | 89.35 | 89.40 | 89.23 | 86.30 | 89.52 | 88.80 | 89.35 | 89.06 |
| % Haze | 0.50 | 0.35 | 0.24 | 0.39 | 5.08 | 0.40 | 0.67 | 0.34 | 0.52 |
| YI | 2.09 | 2.07 | 1.98 | 2.25 | 4.68 | 1.71 | 2.71 | 1.87 | 2.33 |
| Surface Resistivity (ohms) | $2.53 \times 10^{17}$ | $2.10 \times 10^{16}$ | $1.29 \times 10^{13}$ | $3.25 \times 10^{17}$ | $3.15 \times 10^{17}$ | $7.26 \times 10^{15}$ | $2.95 \times 10^{15}$ | $2.48 \times 10^{13}$ | $7.27 \times 10^{12}$ |

The data in Table 4 using C1 Rimar was generated on molded flat discs as described above. Compositions with only C1 Rimar have surface resistivities in the 1017 ohm range (CEx. 7 and 8) indicating that, at the concentrations of 0.03 and 0.06 phr, respectively, C1 Rimar included in these compositions does not affect antistatic behavior. However, when incorporated into antistatic-containing formulations, C1 Rimar acts synergistically with the antistatic agent as an antistatic enhancer being effective in reducing the surface resistivity of polycarbonate compositions.

For instance, by adding 0.03 phr of C1 Rimar into a formulation containing 0.3 phr antistatic agent, the surface resistivity is reduced from $2.10 \times 10^{16}$ ohm to $7.26 \times 10^{15}$ ohm (CEx. 2 compared to Ex. 5). Surprisingly, high transparency and low haze are retained in the molded parts with the added 0.03 phr C1 Rimar. As the minimum level of surface resistivity achieved in compositions with only perfluoroalkyl sulfonate phosphonium salt is about $10^{11}$ ohms (as seen in the description of the FIGURE, above), it is expected that the lower limit of surface resistivity that can be obtained by incorporating C1 Rimar would be in 1010 ohms range (i.e., about one order or magnitude lower than obtainable with only ZONYL® FASP-1 without the inclusion of C1 Rimar).

C1 Rimar incorporated into a polycarbonate composition along with an antistatic agent shows significantly enhanced antistatic characteristics, where the higher the concentration of C1 Rimar up to 0.06 phr, the lower the surface resistivity and static decay times. This results in improved static dissipative properties for the composition, as seen in a comparison of Exs. 5 and 6 with CEx. 2, and in a comparison of Exs. 7 and 8 with CEx. 3. Calculated as above according to equation 1 for examples and comparative examples having the same concentrations of antistatic agent and differing only by the inclusion of C1 Rimar, the surface resistivity of Ex. 5 decreases by 65.4% relative to CEx. 2; Ex. 6 decreases by 86.0% relative to CEx. 2; and Ex. 8 decreases by 43.6% relative to CEx. 3.

The solubility of C1 Rimar in the polycarbonate matrix is limited. For example, at 0.06 phr C1 Rimar, the resulting composition becomes hazy (CEx. 8, Haze=5.08%). However, as observed previously for C4 Rimar, the solubility of C1 Rimar significantly improved in the presence of the antistatic agent. This is seen in a comparison of the haze values of Ex. 6 or Ex. 8 versus CEx. 8, in which the haze values decrease significantly to less than 1% for the combination.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A thermoplastic composition comprising
a polycarbonate,
0.3 to 1.0 parts by weight, per 100 parts of the polycarbonate, of a perfluoroalkyl sulfonate phosphonium salt according to the formula:

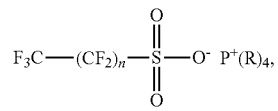

wherein n is an integer of 0 to 3 and each R is independently a $C_{1-22}$ alkyl group, or three of the R groups are the same R group selected from the $C_{1-8}$ alkyl group and the fourth R group is different from the first three R groups and is a $C_{7-22}$ aralkyl group or a $C_{1-22}$ alkyl group, and 0.03 to 0.16 parts by weight, per 100 parts by weight of the polycarbonate, of a non-phosphonium perfluoroalkyl sulfonate salt according to the formula:

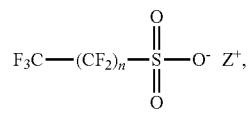

wherein n is an integer of 0 to 3 and $Z^+$ is a non-phosphonium cation, wherein a molded flat disk prepared from the thermoplastic composition has a surface resistivity that is at least 20% lower than the surface resistivity of a molded flat disk prepared from a thermoplastic composition consisting essentially of the polycarbonate and perfluoroalkyl sulfonate phosphonium salt but without the non-phosphonium perfluoroalkyl sulfonate salt.

2. The thermoplastic composition of claim 1, wherein the non-phosphonium perfluoroalkyl sulfonate anion is trifluoromethyl sulfonate, perfluoroethyl sulfonate, perfluoro-n-propyl sulfonate, perfluoro-2-propyl sulfonate, perfluoro-n-butyl sulfonate, perfluoro-2-butyl sulfonate, perfluoroisobutyl sulfonate, perfluoro-t-butyl sulfonate, or a combination comprising at least one of the foregoing perfluoroalkyl sulfonate anions.

3. The thermoplastic composition of claim 1, wherein the perfluoroalkyl sulfonate phosphonium salt is present in the thermoplastic composition in an amount from 0.6 to 1.0 parts by weight, based on 100 parts by weight of the polycarbonate.

4. The thermoplastic composition of claim 1, wherein the polycarbonate comprises bisphenol A carbonate units.

5. The thermoplastic composition of claim 1, further comprising an additive including impact modifier, filler, colorant, antioxidant, heat stabilizer, light stabilizer, ultraviolet light absorber, plasticizer, lubricant, mold release agent, flame retardant, anti-drip agent, radiation stabilizer, or a combination comprising at least one of the foregoing additives, where the additive is present in amount that does not significantly adversely affect the desired properties of the thermoplastic composition.

6. The thermoplastic composition of claim 1, wherein an article molded from the thermoplastic composition and having a thickness of 3.18 millimeters has a haze of 0.01 to 1.0%, according to ASTM D1003-00.

7. The thermoplastic composition of claim 1, wherein an article molded from the thermoplastic composition and having a thickness of 3.18 millimeters has a percent transmission of greater than or equal to 85%, according to ASTM D1003-00.

8. The thermoplastic composition of claim 1, wherein an article molded from the thermoplastic composition and having a thickness of 3.18 millimeters has a yellowness index (YI) of 0.1 to 3, according to ASTM D1925-70.

9. The thermoplastic composition of claim 1, wherein a molded flat disk prepared from the thermoplastic composition has a static decay time for positive charge of 0.1 to 6 seconds, and a static decay time for negative charge of 0.1 to 7 seconds.

10. The thermoplastic composition of claim 1, wherein the non-phosphonium perfluoroalkyl sulfonate salt is present in an amount of 0.08 to 0.16 parts by weight per 100 parts by weight of polycarbonate.

11. A thermoplastic composition according to claim 1 wherein the perfluoroalkyl sulfonate phosphonium salt is according to the formula:

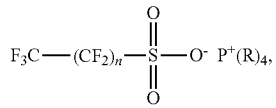

wherein n=3 and each R is independently a $C_{1-22}$ alkyl group, or three of the R groups are the same R group selected from the $C_{1-8}$ alkyl group and the fourth R group is different from the first three R groups and is a $C_{7-22}$ aralkyl group or a $C_{1-22}$ alkyl group.

12. The thermoplastic composition of claim 11, wherein each R is independently a $C_{1-22}$ alkyl group.

13. The thermoplastic composition of claim 1, wherein the perfluoroalkyl sulfonate phosphonium salt is present in an amount of 0.5 to 1.0 parts by weight per 100 parts by weight of the polycarbonate.

14. The thermoplastic composition of claim 13, wherein the perfluoroalkyl sulfonate phosphonium salt is according to the formula:

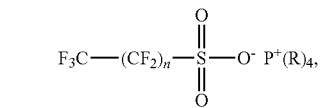

wherein n=3 and each R is independently a $C_{1-22}$ alkyl group, or three of the R groups are the same R group selected from the $C_{1-8}$ alkyl group and the fourth R group is different from the first three R groups and is a $C_{7-22}$ aralkyl group or a $C_{1-22}$ alkyl group.

15. The thermoplastic composition of claim 14, wherein each R is independently a $C_{1-22}$ alkyl group.

16. The thermoplastic composition of claim 1, wherein the non-phosphonium perfluoroalkyl sulfonate salt comprises a cation comprising an alkali metal cation, an alkaline earth metal cation, a transition metal cation, an ammonium cation, a mono-, di-, tri- or tetra-$C_{1-22}$ alkylammonium cation, a pyridinium cation, or a combination comprising at least one of the foregoing cations.

17. The thermoplastic composition of claim 16, wherein the cation is lithium, sodium, potassium, cesium, rubidium, ammonium, tetramethyl ammonium, trimethylbenzyl ammonium, tetraethylammonium, tetrabutylammonium, cetylammonium, pyridinium, or a combination comprising at least one of the foregoing cations.

18. The thermoplastic composition of claim 16, wherein the non-phosphonium perfluoroalkyl sulfonate salt is potassium trifluoromethyl sulfonate, potassium perfluorobutyl sulfonate, or a combination comprising at least one of these.

19. The thermoplastic composition of claim 1, wherein the perfluoroalkyl sulfonate phosphonium salt comprises a tetra ($C_{1-22}$ alkyl) phosphonium cation and perfluoroalkyl sulfonate anion.

20. The thermoplastic composition of claim 19, wherein the tetra($C_{1-22}$ alkyl) phosphonium cation is tetramethyl phosphonium, tetraethyl phosphonium, tetra-n-propyl phosphonium, tetraisopropyl phosphonium, tetrabutyl phosphonium, triethylmethyl phosphonium, tributylmethyl phosphonium, tributylethyl phosphonium, trioctylmethyl phosphonium, trimethylbutyl phosphonium, trimethyloctyl phosphonium, trimethyllauryl phosphonium, trimethylstearyl phosphonium, triethyloctyl phosphonium, trimethylbenzyl phosphonium, triethylbenzyl phosphonium, tributylbenzyl phosphonium, tetraphenyl phosphonium, triphenylmethyl phosphonium, and triphenylbenzyl phosphonium, or a combination comprising at least one of the foregoing cations.

21. The thermoplastic composition of claim 19, wherein the perfluoroalkyl sulfonate phosphonium salt is tetrabutyl phosphonium perfluorobutyl sulfonate.

22. The thermoplastic composition of claim 1, wherein the non-phosphonium perfluoroalkyl sulfonate salt is present in an amount of 0.03 to 0.08 parts by weight per 100 parts by weight of polycarbonate.

23. The thermoplastic composition of claim 22, wherein the perfluoroalkyl sulfonate phosphonium salt is present in an amount of 0.5 to 1.0 parts by weight per 100 parts by weight of the polycarbonate.

24. The thermoplastic composition of claim 22, wherein the non-phosphonium perfluoroalkyl sulfonate salt is present in the thermoplastic composition in an amount of from 0.6 to 1.0 parts by weight per 100 parts by weight of the polycarbonate.

25. The thermoplastic composition of claim 22, wherein the perfluoroalkyl sulfonate phosphonium salt is according to the formula:

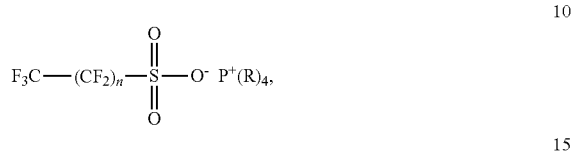

wherein n=3 and each R is independently a $C_{1-22}$ alkyl group, or three of the R groups are the same R group selected from the $C_{1-8}$ alkyl group and the fourth R group is different from the first three R groups and is a $C_{7-22}$ aralkyl group or a $C_{1-22}$ alkyl group.

26. The thermoplastic composition of claim 25, wherein each R is independently a $C_{1-22}$ alkyl group.

* * * * *